United States Patent
Chang et al.

(10) Patent No.: US 10,139,947 B2
(45) Date of Patent: Nov. 27, 2018

(54) TOUCH-SENSING DEVICE HAVING LIGHT-SHIELDING LAYERS WITH DIFFERENT EDGE ROUGHNESS

(71) Applicant: InnoLux Corporation, Miao-Li County (TW)

(72) Inventors: Chia-Hsiung Chang, Miao-Li County (TW); Yang-Chen Chen, Miao-Li County (TW); Kuo-Chang Su, Miao-Li County (TW); Hsia-Ching Chu, Miao-Li County (TW)

(73) Assignee: INNOLUX CORPORATION, Miao-Li County (TW)

( * ) Notice: Subject to any disclaimer, the term of this patent is extended or adjusted under 35 U.S.C. 154(b) by 60 days.

(21) Appl. No.: 15/174,736

(22) Filed: Jun. 6, 2016

(65) Prior Publication Data
US 2016/0370892 A1 Dec. 22, 2016

(30) Foreign Application Priority Data
Jun. 18, 2015 (TW) .............................. 104119717 A (51) Int. Cl.
*G06F 3/041* (2006.01)
*G06F 3/044* (2006.01)

(52) U.S. Cl.
CPC ............ *G06F 3/0416* (2013.01); *G06F 3/044* (2013.01)

(58) Field of Classification Search
CPC .................................................... G06F 3/0416
See application file for complete search history.

(56) References Cited

U.S. PATENT DOCUMENTS

| | | | | |
|---|---|---|---|---|
| 2013/0309601 A1* | 11/2013 | Fukaya | ..................... | G03F 1/30 430/5 |
| 2014/0340592 A1* | 11/2014 | Lin | ........................ | G06F 1/1692 349/12 |
| 2015/0021153 A1* | 1/2015 | Stone | ................. | H03K 17/9622 200/5 R |
| 2015/0059169 A1* | 3/2015 | Li | ........................... | C03B 27/00 29/829 |
| 2015/0109238 A1* | 4/2015 | Chen | ....................... | G06F 3/046 345/174 |
| 2015/0114815 A1* | 4/2015 | Chang | ...................... | H05K 3/46 200/5 R |
| 2015/0212350 A1* | 7/2015 | Niiyama | ................. | B32B 27/00 349/122 |

* cited by examiner

*Primary Examiner* — Kumar Patel
*Assistant Examiner* — Richard M Russell
(74) *Attorney, Agent, or Firm* — McClure, Qualey & Rodack, LLP (57) ABSTRACT

A touch-sensing device is provided, which includes a substrate with a central region and a peripheral region, and a first light-shielding layer disposed on the peripheral region, wherein the first light-shielding layer has a first edge adjacent to the central region. The device further includes a touch-sensing layer disposed on the central region, and a part of the touch-sensing layer extends onto the peripheral region to cover a part of the first light-shielding layer. The device also includes a conductive line layer disposed on the first light-shielding layer, and a second light-shielding layer covering at least a part of the first light-shielding layer and at least a part of the conductive line layer. The second light-shielding layer has a second edge adjacent to the central region, and the second edge has a profile roughness that is greater than that of the first edge.

20 Claims, 7 Drawing Sheets

TOUCH-SENSING DEVICE HAVING LIGHT-SHIELDING LAYERS WITH DIFFERENT EDGE ROUGHNESS

CROSS REFERENCE TO RELATED APPLICATIONS

This Application claims priority of Taiwan Patent Application No. 104119717, filed on Jun. 18, 2015, the entirety of which is incorporated by reference herein.

BACKGROUND

Technical Field

The disclosure relates to a touch-sensing device, and in particular it relates to the edges of light-shielding layers in a touch-sensing device.

Description of the Related Art

Because touch-sensing devices are designed to provide a medium for human-device interaction, touch-sensing devices have been widely applied in combination with display devices to form touch-sensing display apparatuses such as mobile phones, navigation satellite systems, panel computers, personal digital assistants, and notebook computers. A touch-sensing panel should be attached to the display face of the display device, so that the touch-sensing panel may sense the touch location of a user.

In the general methods of manufacturing a touch-sensing device, a black matrix (BM) can be formed to shield peripheral regions on four sides of the touch-sensing device, and metal lines are then formed on the BM. An ink layer can be then formed to cover the metal lines. In general, the ink layer has a greater thickness, and problems such as poor adhesion or even a propensity to peel or wrap can occur easily at the edges of the ink layer, thereby negatively influencing product yield.

Accordingly, a novel light-shielding design is called for for overcoming the problems described above.

BRIEF SUMMARY

One embodiment of the disclosure provides a touch-sensing device including a substrate having a central region and a peripheral region. The touch-sensing device also includes a first light-shielding layer disposed on the peripheral region, wherein the first light-shielding layer has a first edge adjacent to the central region. The touch-sensing device also includes a touch-sensing layer disposed on the central region, wherein a part of the touch-sensing layer extends onto the peripheral region to cover a part of the first light-shielding layer; a conductive line layer is disposed on the first light-shielding layer. The touch-sensing device also includes a second light-shielding layer covering at least a part of the first light-shielding layer and at least a part of the conductive line layer, wherein the second light-shielding layer has a second edge adjacent to the central region, wherein the second edge has a profile roughness that is greater than that of the first edge.

One embodiment of the disclosure provides a touch-sensing device including a substrate, a touch-sensing element disposed on the substrate, and a first light-shielding layer disposed on the substrate and overlapping a part of the touch-sensing device. The touch-sensing device also includes a plurality of conductive lines disposed on the first light-shielding layer, wherein the conductive lines and the touch-sensing element are electrically connected and a second light-shielding layer is covering a part of the conductive lines and a part of the first light-shielding layer. The second light-shielding layer has a non-straight edge adjacent to an edge of the touch-sensing element, and the second light-shielding layer covers a part of one of the conductive lines and exposes another part of the one of the conductive lines.

A detailed description is given in the following embodiments with reference to the accompanying drawings.

BRIEF DESCRIPTION OF THE DRAWINGS

The disclosure can be more fully understood by reading the subsequent detailed description and examples with references made to the accompanying drawings, wherein.

DETAILED DESCRIPTION

The following description is of the best-contemplated mode of carrying out the disclosure. This description is made for the purpose of illustrating the general principles of the disclosure and should not be taken in a limiting sense. The scope of the disclosure is best determined by reference to the appended claims.

Figure 1:
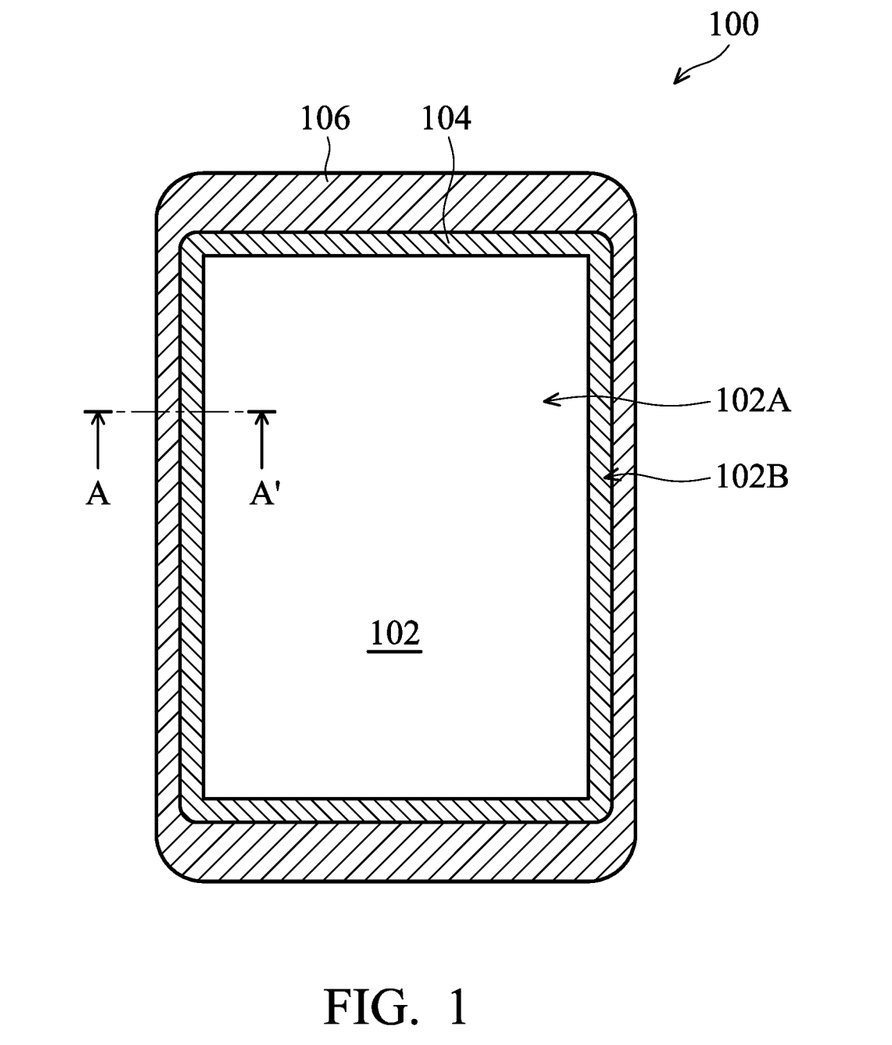
FIG. 1 shows a top view of a touch-sensing device in one embodiment of the disclosure.
Figure 2:
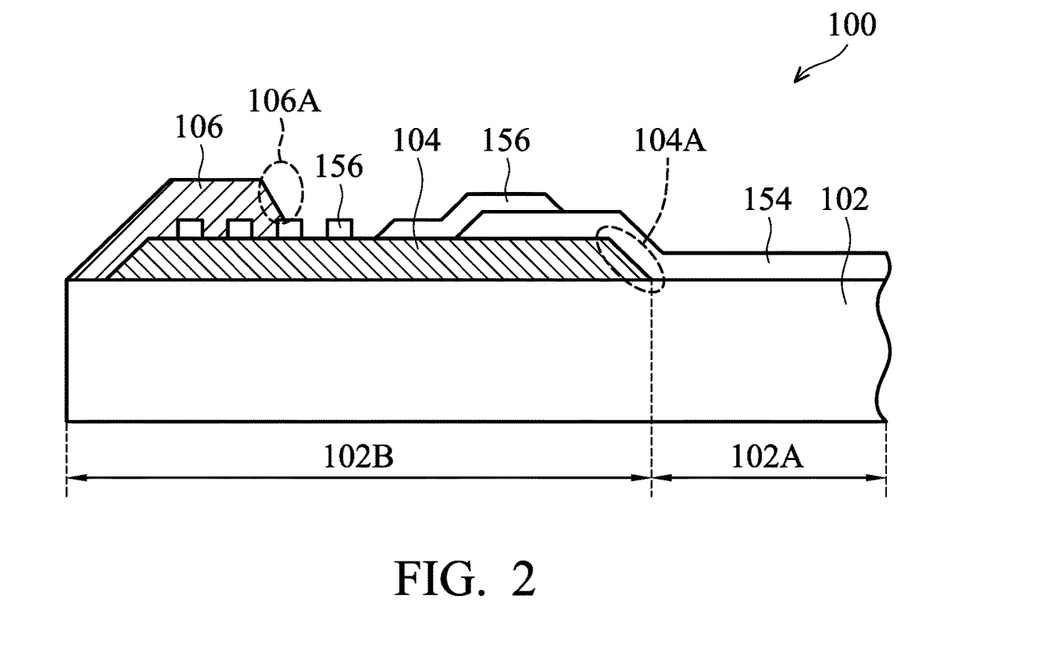
FIG. 2 shows a cross-sectional view of a part of a touch-sensing device in one embodiment of the disclosure.
Figure 3:
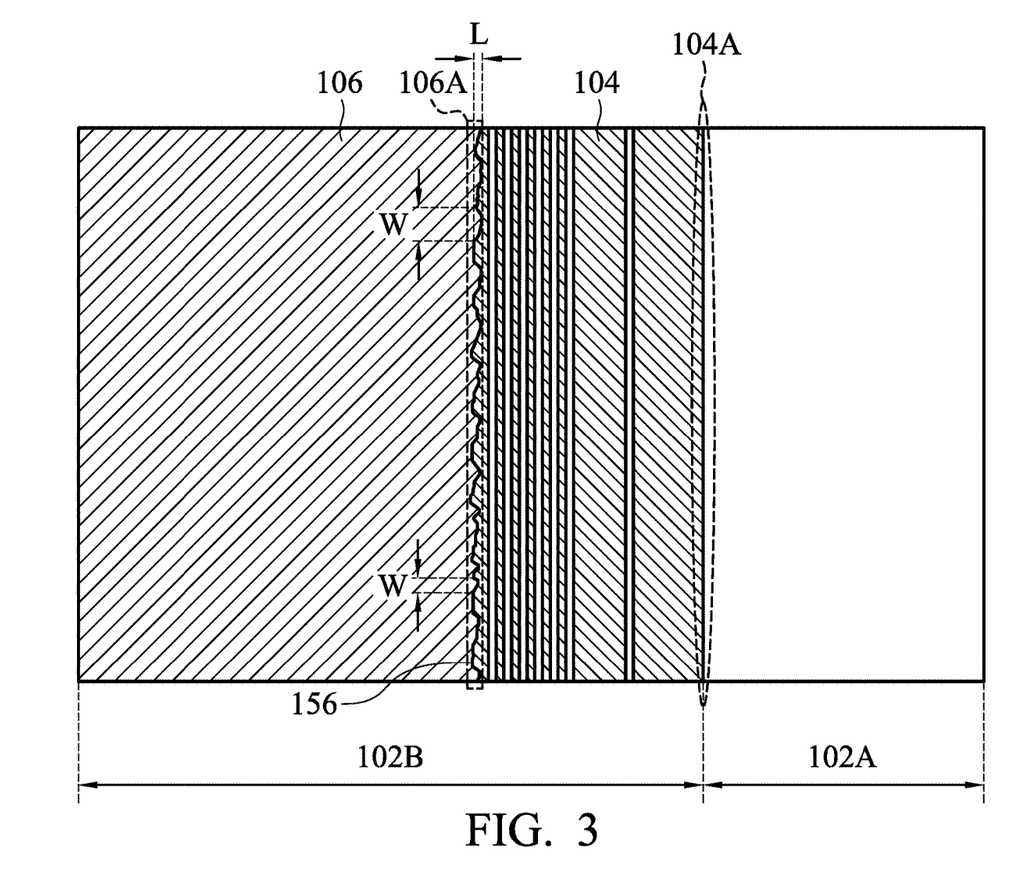
FIG. 3 shows a top view of a part of a touch-sensing device in one embodiment of the disclosure.

FIG. 1 shows a top view of a touch-sensing device 100 in one embodiment of the disclosure. FIG. 2 shows a cross-sectional view corresponding to a section line A-A in FIG. 1. The touch-sensing device 100 includes a substrate 102, which is divided into a central region 102A (also referred as a touch-sensing region) and a peripheral region 102B. In one embodiment, the substrate 102 can be glass, sapphire, quartz, plastic, or another usual substrate material. As shown in FIG. 2, a first light-shielding layer 104 is disposed on the peripheral region 102B, and a touch-sensing layer 154 is disposed on the central region 102A. A part of the touch-sensing layer 154 extends onto the first light-shielding layer 104. The first light-shielding layer 104 can be a photoresist material with a general color of black, or a light-shielding material with another color such as red, blue, yellow, green, cyan, white, or another color. In one embodiment, the first light-shielding layer 104 can be a multi-layered structure in a color other than black. For example, the first light-shielding layer 104 may include a bottom pattern layer and a top layer conformally formed on the bottom pattern layer. The multi-layered structure can be the same color or different colors, including but not limited to a white bottom pattern layer and a white top layer, a white bottom pattern layer and a yellow top layer, or other variations. In one embodiment, the first light-shielding layer 104 has a thickness of about 1.2 micrometers to about 1.5 micrometers. An overly thick first light-shielding layer 104 may increase the thickness and the material cost of the touch-sensing device 100. An overly thin first light-shielding layer 104 may not completely cover the peripheral region 102B and cause light leakage or cause the user to see a plurality of conductive lines 156 disposed on the first light-shielding layer 104. In one embodiment, the edge of the first light-shielding layer 104 that is adjacent to the central region 102A is defined as a first edge 104A. As shown in FIG. 3, the first edge 104A is a relatively straight line. In other words, when the first light-shielding layer 104 is composed of a photoresist material, the first edge 104A appears as a relatively straight line even if the profile of the first edge 104A has a little roughness at a microscopic view.

The touch-sensing layer 154 may include a plurality of first axial electrodes (not shown) and a plurality of second axial electrodes (not shown) to sense a location where a user touches the touch-sensing device 100. The first axial electrodes and the second axial electrodes can be constructed by a single conductive pattern layer or double conductive pattern layers. In one embodiment, the conductive pattern layer can be a transparent conductive layer, a metal mesh, or a stack of the transparent conductive layer and the metal mesh. The transparent conductive layer can be composed of metal oxide such as ITO, silver nanowire, carbon nanotube, graphene, silicone, or conductive polymer. The shape and arrangement direction of the first axial electrodes and the second axial electrodes can be adjusted if necessary. As shown in FIG. 2, a part of the touch-sensing layer 154 (such as terminals of the first axial electrodes and the second axial electrodes) extends onto the first light-shielding layer 104 of the peripheral region 102B for connecting to conductive lines described below.

As shown in FIG. 2, a conductive line layer with a plurality of conductive lines 156 is disposed on the first light-shielding layer 104. Each of the conductive lines 156 may electrically connect to the first axial electrode and the second axial electrode of the touch-sensing layer 154, respectively, for transferring external signals to the touch-sensing layer 154 (or transferring signals sensed by the touch-sensing layer 154 to an external circuit (not shown). In the example illustrated in FIG. 2, the touch-sensing layer 154 is formed before forming the conductive line layer, such that the conductive lines 156 extend onto a part of the touch-sensing layer 154 on the first light-shielding layer 104. Alternatively, the conductive line layer can be formed before forming the touch-sensing layer 154, such that a part of the touch-sensing layer 154 extending onto the first light-shielding layer 104 is disposed on the conductive lines 156 (not shown). In one embodiment, the conductive lines 156 can be composed of copper, aluminum, molybdenum, silver, gold, an alloy thereof, a multi-layered structure thereof, graphene, silicene, or the like.

As shown in FIG. 2, the second light-shielding layer 106 covers at least a part of the first light-shielding layer 104 and at least a part of the conductive line layer (e.g. a part of the conductive lines 156). In some embodiments, the second light-shielding layer 106 forms a covering region and a non-covering layer on one of the conductive lines 156. The covering region at least strides over the line width of the conductive line 156, and the non-covering region exposes a partial segment of the conductive line 156. In one embodiment, the second light-shielding layer can be composed of an ink material. The second light-shielding layer 106 has an average pore diameter greater than that of the first light-shielding layer 104. In other words, the material of the first light-shielding layer 104 is denser than the material of the second light-shielding layer 106. It can be seen that most of the pore diameter per area of the second light-shielding layer 106 is greater than that of the first light-shielding layer 104. For example, 70% of the pore diameter per area of the second light-shielding layer 106 is greater than that of the first light-shielding layer 104. In one embodiment, the second light-shielding layer 106 has a thickness of about 3 micrometers to about 9 micrometers, preferably 6 micrometers to 8 micrometers. An overly thick second light-shielding layer 106 will increase the thickness of the touch-sensing device 100. An overly thin light-shielding layer 106 cannot prevent the conductive lines from scratch damage from external force. In one embodiment, the second light-shielding layer 106 can be a multi-layered structure in a color other than black. The above second light-shielding layer 106 has second edge 106A adjacent to the central region 102A, and the second edge 106A is not straight. As shown in FIG. 3, the top view along a normal direction of the substrate 102, the second edge 106A of the second light-shielding layer 106 has a profile roughness that is greater than that of the first edge 104A of the first light-shielding layer 104. For example, the second light-shielding layer 106 covers a part of the conductive lines 156 but does not cover other parts of the conductive lines 156. The non-straight second edge 106A may efficiently increase the adhesion between the second light-shielding layer 106 and the first light-shielding layer 104 (and the conductive lines 156), thereby preventing the peeling or warping problems of the second light-shielding layer 106.

In one embodiment, the first edge 104A and the second edge 106A have a distance of 0.1 mm to 5 mm therebetween. An overly long distance between the first edge 104A and the second edge 106A makes the second light-shielding layer 106 fail to cover any conductive line 156, thereby reducing the adhesion of the second light-shielding layer 106. An overly short distance between the first edge 104A and the second edge 106A (e.g. the second light-shielding layer 106 completely covers the first light-shielding layer 104, or even beyond the first edge 104A of the first light shielding layer 104), the non-straight second edge 106A of the second light-shielding layer 106 may cover a part of the central region 102A due to a process error, thereby reducing the product yield.

As shown in FIG. 3, the profile roughness of the first edge 104A is set as a basis, and the profile roughness of the second edge 106A is non-straight compared to that of the first edge 104A. The non-straight second edge 106A has a wave-liked and irregular structure along the direction parallel to the top surface of the substrate 102 (contacting the surface of the first light-shielding layer 104), wherein the irregular structure has a plurality of protrusions with different lengths and different widths. The protrusions along the direction parallel to the top surface of the substrate 102 have a protruding lengths L and widths W. The protruding lengths L are between 10 micrometers and 100 micrometers (varied distance), preferably from 15 micrometers to 40 micrometers. The widths W are between 40 micrometers and 350 micrometers, preferably from 50 micrometers to 270 micrometers. An overly long protruding length L makes the protrusion peel easily. An overly short protruding length L easily results in poor adhesion of the second light-shielding layer 106. An overly long width W makes the protrusion peel easily. An overly short width easily results in poor adhesion of the second light-shielding layer 106. Compared to the profile roughness of the second edge 106A, the profile roughness of the first edge 104A is relatively straight, or with a varied distance of less than 5 micrometers along the direction parallel to the top surface of the substrate 102.

Back to FIG. 1, the width of the second light-shielding layer 106 corresponding to the top and bottom of the substrate 102 is different from the width of the second light-shielding layer 106 corresponding to the right and left sides of the substrate 102. In one embodiment, the width of the second light-shielding layer 106 corresponding to the top of the substrate 102 is different from the width of the second light-shielding layer 106 corresponding to the bottom of the substrate 102. The above design is based on the different area of the peripheral region 102B corresponding to different sides of the substrate 102.

Figure 9:
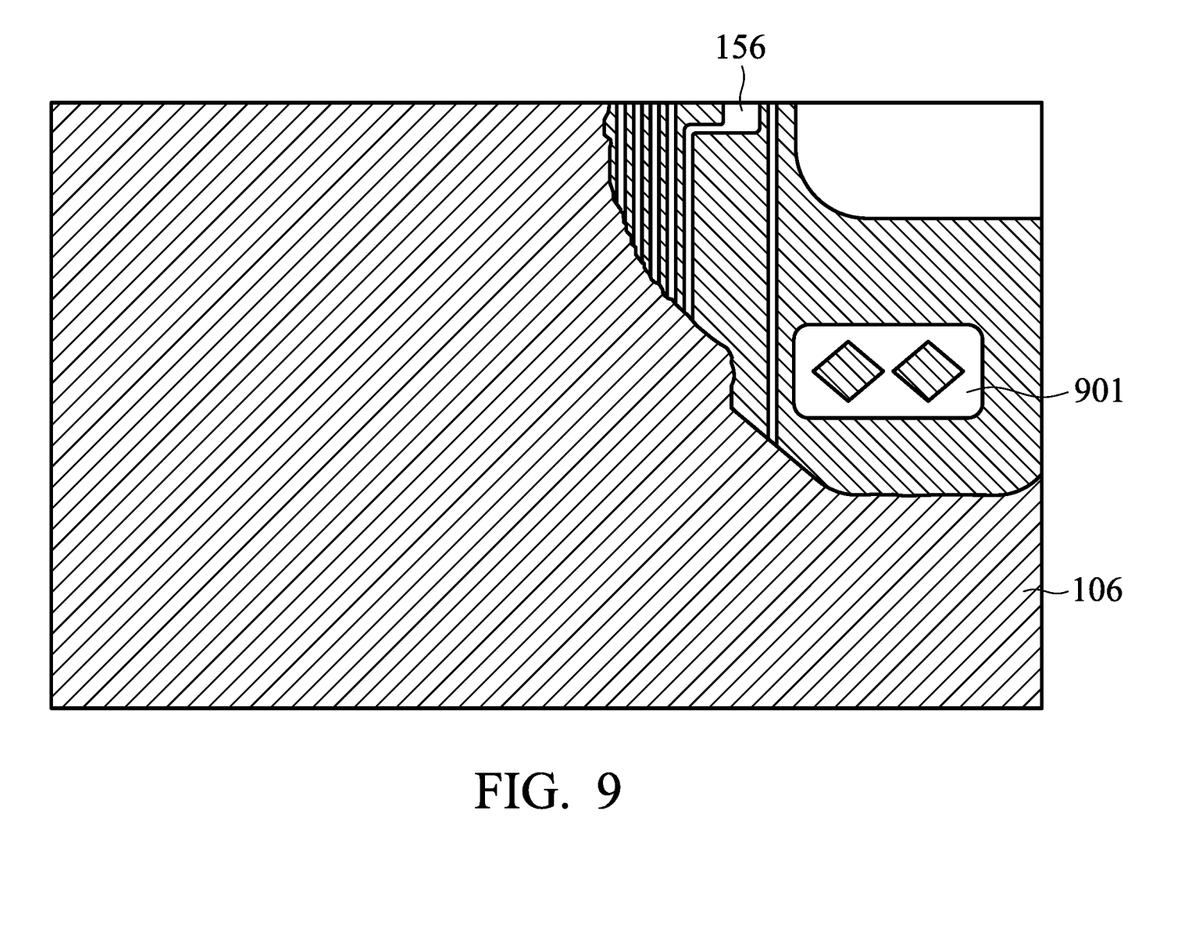
FIG. 9 shows a top view of a part of a touch-sensing device in one embodiment of the disclosure.

In one embodiment, the touch-sensing device 100 further includes an alignment mark 901 on the peripheral region 102B, as shown in FIG. 9. In general, the alignment mark 901 and the conductive lines 156 of the conductive line layer are formed simultaneously on the first light-shielding layer 104, so that the alignment mark 901 and the conductive lines 156 can be composed of the same material. The alignment mark 901 may serve as a reference point while attaching the touch-sensing device 100 to a display device, and/or an anchor point for detecting the touch-sensing device 100 during the manufacturing of the touch-sensing device 100. The second light-shielding layer 106 does not cover the alignment mark 901, and the alignment mark 901 and the second light-shielding layer 106 have a distance of 80 μm to 400 μm therebetween. An overly long distance between the alignment mark 901 and the second light-shielding layer 106 may expose the conductive lines 156 that should be covered, so that the exposed conductive lines 156 risk being scratched or otherwise damaged by an external force. An overly short distance between the alignment mark 901 and the second light-shielding layer 106 may cause the second light-shielding layer 106 to cover the alignment mark 901 due to a process error.

Figure 4:
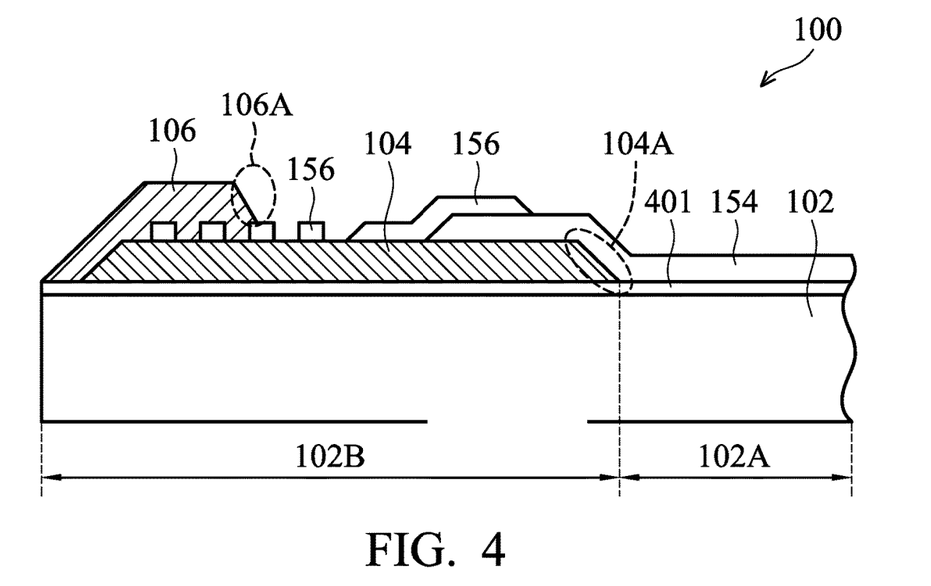
FIG. 4 shows a cross-sectional view of a part of a touch-sensing device in one embodiment of the disclosure.

In one embodiment, a buffer layer 401 can be formed on a surface of the substrate 102 before forming the first light-shielding layer 104 and the touch-sensing layer 154 on the substrate 102, as shown in FIG. 4. The buffer layer 401 may include an organic material such as polyimide, acrylate, epoxy resin, siloxane, a combination thereof, or a multi-layered structure thereof; or an inorganic material such as silicon oxide, silicon nitride, titanium oxide, a combination thereof, or a multi-layered structure thereof. The buffer layer 401 may efficiently enhance the mechanical strength such as impact resistance (e.g. enhance and strengthen the performance of the glass substrate in a ball drop test) of the touch-sensing device. In one embodiment, the buffer layer 401 has a thickness of 0.2 micrometers to 3 micrometers. An overly thin buffer layer 401 has no effect, and an overly thick buffer layer 401 may result in color shift, and negatively influence the optical or visual effect.

Figure 5:
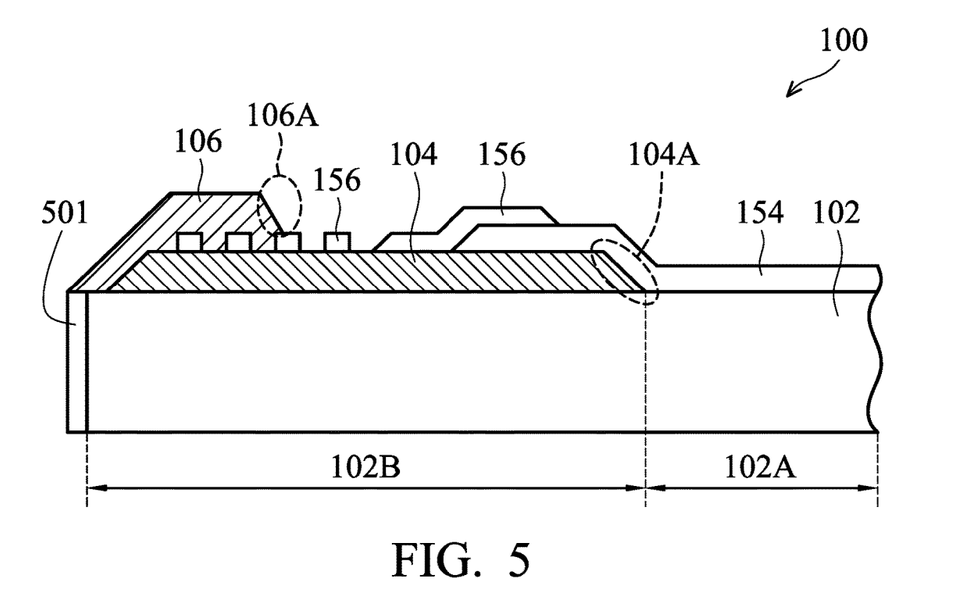
FIG. 5 shows a cross-sectional view of a part of a touch-sensing device in one embodiment of the disclosure.

In one embodiment, the edge of the substrate 102 can be wrapped by a protection layer 501, as shown in FIG. 5. The protection layer 501 may enhance the impact resistance of the side of the substrate 102. In one embodiment, the protection layer 501 may include an organic material such as polyimide, acrylate, epoxy resin, siloxane, a combination thereof, or a multi-layered structure thereof; or an inorganic material such as silicon oxide, silicon nitride, titanium oxide, or a multi-layered structure thereof. The protection layer 501 may efficiently increase the mechanical strength such as the impact resistance of the touch-sensing device. In one embodiment, the buffer layer 401 in FIG. 4 and the protection layer 501 in FIG. 5 can be formed simultaneously to have the same composition and the same thickness. Note that if the protection layer 501 in FIG. 5 is adopted, the second light-shielding layer 106 may cover the protection layer 501 further to avoid light leakage or to meet aesthetic requirements.

Figure 6:
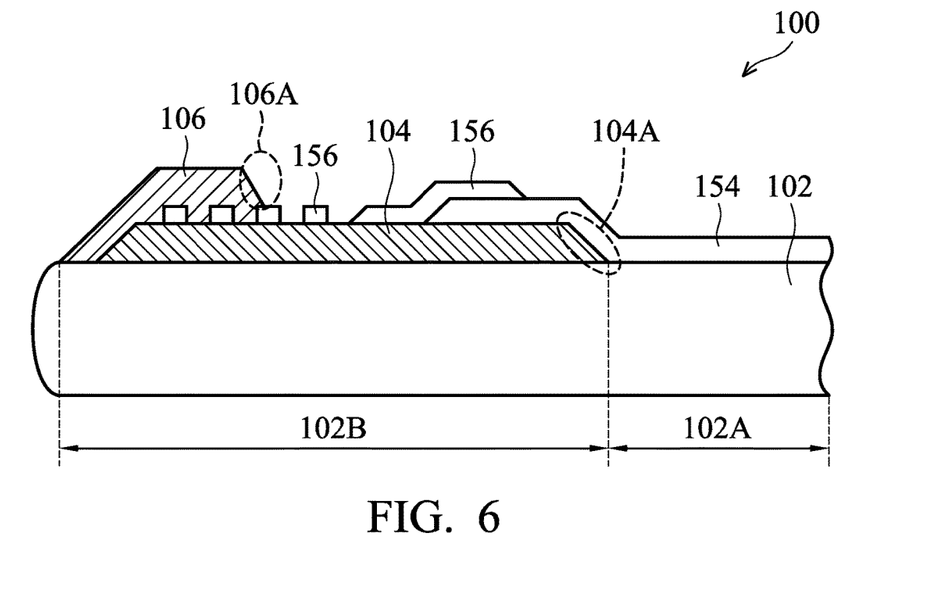
FIG. 6 shows a cross-sectional view of a part of a touch-sensing device in one embodiment of the disclosure.
Figure 7:
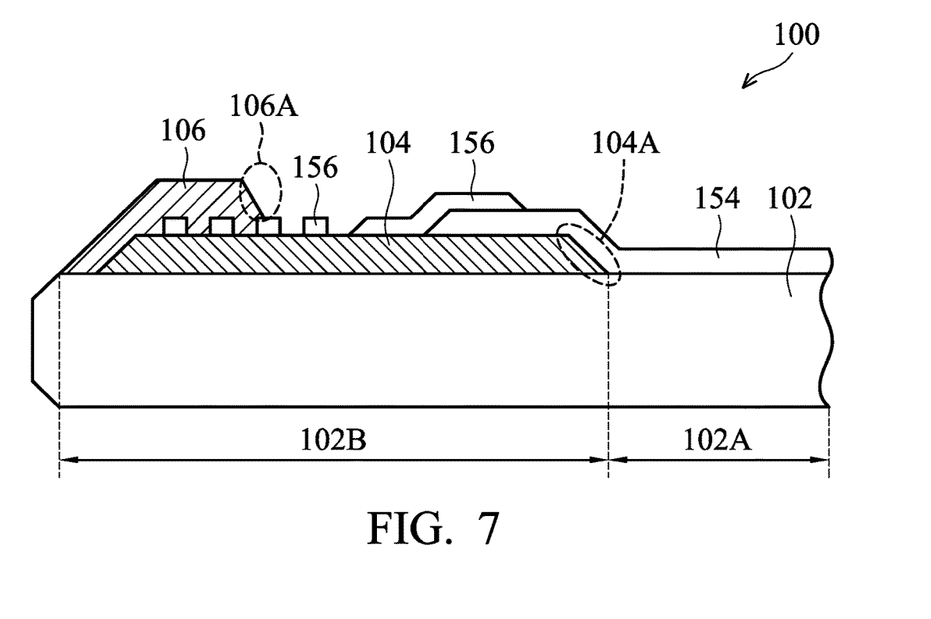
FIG. 7 shows a cross-sectional view of a part of a touch-sensing device in one embodiment of the disclosure.

In one embodiment, the edge of the substrate 102 is curved (see FIG. 6) or polygon-shaped with an obtuse angle (see FIG. 7). Compared to the substrate 102 in FIG. 2, the designs in FIGS. 6 and 7 may prevent the corners of the substrate 102 from being easily damaged or even cracked by an external force. Although the polygon in FIG. 7 has three sides, one skilled in the art should understand that the polygon may have more sides. In addition, the designs in FIGS. 6 and 7 may collocate with the buffer layer 401 in FIG. 4, the protection layer 501 in FIG. 5, or a combination thereof to further improve the impact resistance of the substrate 102. The second light-shielding layer 106 in FIGS. 6 and 7 may also cover a part of the curved edge or a part of the polygon-shaped edge in the substrate 102 (not shown).

Figure 8:
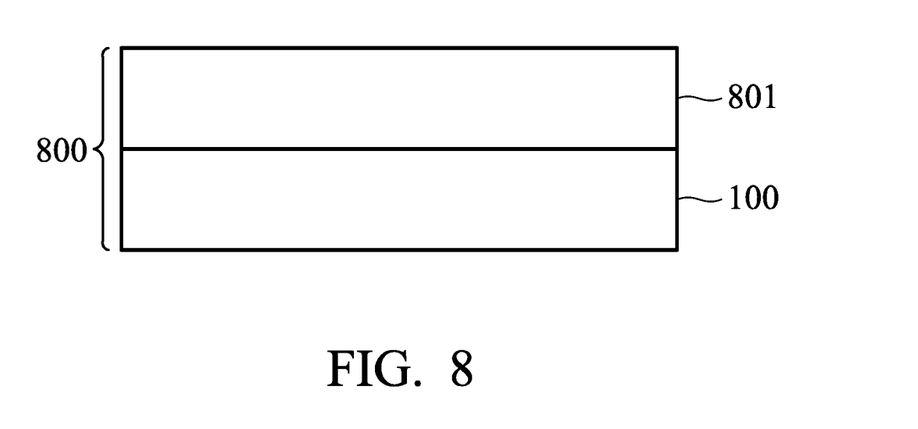
FIG. 8 shows a touch-sensing device in one embodiment of the disclosure.

In one embodiment, the touch-sensing device 100 and a display device 801 are attached to form a touch-sensing display apparatus 800, as shown in FIG. 8. Note that the substrate 102 of the touch-sensing device 100 may serve as a substrate of the display device, in which a color filter layer, an array layer, or a combination thereof can be formed under the substrate 102. In one embodiment, the display device 801 can be, but is not limited to, electronic paper, an electronic reader, an electroluminescent display (ELD), an organic electroluminescent display (OELD), a light-emitting diode display (LED), a liquid-crystal display (LCD), a plasma display panel (PDP), a quantum dot laser display, a liquid-crystal laser display, a quantum dot light-emitting diode (QD-LED), a telescopic pixel display (TPD), an organic light-emitting transistor (OLET), or the like.

While the disclosure has been described by way of example and in terms of the preferred embodiments, it is to be understood that the disclosure is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A touch-sensing device, comprising:
    a substrate having a central region and a peripheral region;
    a first light-shielding layer disposed on the peripheral region, wherein the first light-shielding layer has a first edge in a top view and adjacent to the central region;
    a touch-sensing layer disposed on the central region, wherein a part of the touch-sensing layer extends onto the peripheral region to cover a part of the first light-shielding layer;
    a conductive line layer disposed on the first light-shielding layer; and
    a second light-shielding layer disposed on the peripheral region and covering at least a part of the first light-shielding layer and at least a part of the conductive line layer, wherein the second light-shielding layer has a second edge in the top view and adjacent to the central region,
    wherein a profile roughness of the second edge is greater than a profile roughness of the first edge.

2. The touch-sensing device as claimed in claim 1, wherein the conducting line layer comprises a plurality of conductive lines, wherein the second light-shielding layer covers a part of the conductive lines and exposes another part of the conductive lines.

3. The touch-sensing device as claimed in claim 2, wherein the second light-shielding layer forms a covering region and a non-covering region on one of the conductive lines, the covering region strides over a line width of the one of the conductive lines, and the non-covering region exposes a partial segment of the one of the conductive lines.

4. The touch-sensing device as claimed in claim 1, wherein the second light-shielding layer has an average pore diameter greater than that of the first light-shielding layer.

5. The touch-sensing device as claimed in claim 1, wherein a width of the second light-shielding layer corresponding to a first side of the substrate is different from another width of the second light-shielding layer corresponding to a second side of the substrate.

6. The touch-sensing device as claimed in claim 1, further comprising an alignment mark on the peripheral region, wherein the alignment mark is not covered by the second light-shielding layer, and the alignment mark and the second light-shielding layer have a distance of 80 μm to 400 μm therebetween.

7. The touch-sensing device as claimed in claim 1, wherein the first light-shielding layer is a photoresist material, and the second light-shielding layer is an ink material.

8. The touch-sensing device as claimed in claim 1, wherein the first light-shielding layer is a color other than black.

9. The touch-sensing device as claimed in claim 1, wherein the first light-shielding layer is a multi-layered structure.

10. The touch-sensing device as claimed in claim 9, wherein the first light-shielding layer includes a bottom pattern layer and a top layer conformally formed on the bottom pattern layer.

11. The touch-sensing device as claimed in claim 1, wherein the first light-shielding layer has a first surface, and the first surface includes the first edge nearest to the central region, and wherein the second light-shielding layer has a second surface, and the second surface includes the second edge nearest to the central region.

12. The touch-sensing device as claimed in claim 1, wherein the first edge of the first light-shielding layer and the second edge of the second light-shielding layer have a distance of 0.1 mm to 5 mm therebetween.

13. The touch-sensing device as claimed in claim 1, wherein an edge of the substrate is curved or polygon-shaped with an obtuse angle.

14. The touch-sensing device as claimed in claim 1, further comprising a protection layer wrapping an edge of the substrate.

15. The touch-sensing device as claimed in claim 1, further comprising a buffer layer between the substrate and the first light-shielding layer and the touch-sensing layer.

16. A touch-sensing display apparatus, comprising:
the touch-sensing device as claimed in claim 1; and
a display device attached to the touch-sensing device.

17. A touch-sensing device, comprising:
a substrate having a peripheral region;
a touch-sensing element disposed on the substrate;
a first light-shielding layer disposed on the substrate and overlapping a part of the touch-sensing element;
a plurality of conductive lines disposed on the first light-shielding layer, wherein the conductive lines and the touch-sensing element are electrically connected; and
a second light-shielding layer disposed on the peripheral region and covering a part of the conductive lines and a part of the first light-shielding layer;
wherein the second light-shielding layer has a second edge in a top view and adjacent to an edge of the touch-sensing element, and the second edge is non-straight;
wherein the second light-shielding layer covers a part of one of the conductive lines and exposes other part of the one of the conductive lines.

18. The touch-sensing device as claimed in claim 17, wherein the second light-shielding layer forms a covering region and a non-covering region on one of the conductive lines, the covering region strides over a line width of the one of the conductive lines, and the non-covering region exposes a partial segment of the one of the conductive lines.

19. The touch-sensing device as claimed in claim 17, further comprising an alignment mark on the peripheral region, wherein the alignment mark is not covered by the second light-shielding layer, and the alignment mark and the second light-shielding layer have a distance of 80 μm to 400 μm therebetween.

20. The touch-sensing device as claimed in claim 17, wherein the first light-shielding layer is a photoresist material, and the second light-shielding layer is an ink material.

* * * * *